US008639674B2

(12) United States Patent
Vishniac et al.

(10) Patent No.: US 8,639,674 B2
(45) Date of Patent: Jan. 28, 2014

(54) MANAGING STORAGE OF INDIVIDUALLY ACCESSIBLE DATA UNITS

(75) Inventors: Ephraim Meriwether Vishniac, Arlington, MA (US); Marshall A. Isman, Newton, MA (US); Paul Bay, Arlington, MA (US); H. Mark Bromley, Lyndeborough, NH (US); John L. Richardson, Santa Barbara, CA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 13/552,706

(22) Filed: Jul. 19, 2012

(65) Prior Publication Data

US 2012/0284240 A1 Nov. 8, 2012

Related U.S. Application Data

(63) Continuation of application No. 11/555,458, filed on Nov. 1, 2006, now Pat. No. 8,229,902.

(51) Int. Cl.
*G06F 17/30* (2006.01)

(52) U.S. Cl.
USPC ........................................................ 707/693

(58) Field of Classification Search
USPC .................. 707/640, 706, 802, 999.204, 693; 711/161, 162
See application file for complete search history.

(56) References Cited

U.S. PATENT DOCUMENTS

| 4,775,932 | A | | 10/1988 | Oxley et al. |
| 5,659,733 | A | * | 8/1997 | Yamashita .................... 707/752 |
| 5,737,593 | A | | 4/1998 | Agrawal et al. |
| 6,278,992 | B1 | | 8/2001 | Curtis et al. |
| 6,309,424 | B1 | * | 10/2001 | Fallon ............................. 341/51 |
| 6,510,425 | B1 | * | 1/2003 | Okamoto et al. ..................... 1/1 |
| 6,873,993 | B2 | | 3/2005 | Charlesworth et al. |
| 6,970,866 | B1 | * | 11/2005 | Pravetz et al. ........................ 1/1 |
| 6,996,573 | B2 | * | 2/2006 | Syvanne ................................ 1/1 |
| 8,214,331 | B2 | | 7/2012 | Kulkarni et al. |
| 8,229,902 | B2 | | 7/2012 | Vishniac et al. |
| 2001/0005885 | A1 | * | 6/2001 | Elgamal et al. ............... 713/164 |
| 2002/0052870 | A1 | * | 5/2002 | Charlesworth et al. .......... 707/3 |
| 2002/0073096 | A1 | * | 6/2002 | Shaath et al. ................. 707/102 |

(Continued)

FOREIGN PATENT DOCUMENTS

| JP | 63-037425 | 2/1988 |
| JP | 64-058018 | 3/1989 |

(Continued)

OTHER PUBLICATIONS

Japanese Office Action, with English Translation, JP Application No. 2009-535408, Aug. 8, 2012, 6 pages.

(Continued)

*Primary Examiner* — Robert Beausoliel, Jr.
*Assistant Examiner* — Noosha Arjomandi
(74) *Attorney, Agent, or Firm* — Fish & Richardson P.C.

(57) ABSTRACT

A method for managing data includes receiving individually accessible data units, each identified by a key value; storing a plurality of blocks of data, each of at least some of the blocks being generated by combining a plurality of the data units; and providing an index that includes an entry for each of the blocks. One or more of the entries enable location, based on a provided key value, of a block that includes data units corresponding to a range of key values that includes the provided key value.

87 Claims, 8 Drawing Sheets

(56) References Cited

U.S. PATENT DOCUMENTS

| | | | |
|---|---|---|---|
| 2004/0049485 A1* | 3/2004 | Obermaier et al. | 707/1 |
| 2004/0236743 A1 | 11/2004 | Blaicher et al. | |
| 2006/0184563 A1 | 8/2006 | Potter | |
| 2007/0005598 A1* | 1/2007 | Okamoto et al. | 707/7 |
| 2008/0015945 A1* | 1/2008 | Goldstein | 705/26 |
| 2008/0104149 A1 | 5/2008 | Vishniac et al. | |
| 2008/0235377 A1 | 9/2008 | Fukuzawa et al. | |
| 2009/0136130 A1 | 5/2009 | Piper | |
| 2009/0248645 A1 | 10/2009 | Ogura | |
| 2009/0287986 A1 | 11/2009 | Vishniac et al. | |

FOREIGN PATENT DOCUMENTS

| | | |
|---|---|---|
| JP | 05-257774 | 10/1993 |
| JP | 07-287716 | 10/1995 |
| JP | H08-23865 | 3/1996 |
| WO | WO2008/043082 | 4/2008 |

OTHER PUBLICATIONS

Chen, Z. et al., "Query Optimization in Compressed Database Systems" *ACM SIGMOD* May 21-24, 2001, Santa Barbara, California, USA.

Comer, Douglas, "The Ubiquitous B-Tree." *Computing Surveys*, vol. 11, No. 2, Jun. 1979, pp. 121-137.

International Search Report and Written Opinion issued in PCT application No. PCT/US2010/026817, dated May 10, 2010, 13 pages.

Chinese Office Action (English translation) issued in CN application No. 200780040946.9, dated Mar. 30, 2011, 7 pages.

Stanfill, Craig. "Massively Parallel Information Retrieval for Wide Area Information Servers," Systems, Man, and Cybernetics, 1991. Decision Aiding for Complex Systems, Conference Proceedings, 1991 IEEE International Conference, Oct. 13-16, 1991, vol. 1, pp. 679-682.

Xiukun, Wang et al., "Machine translation dictionary based on Hash method," English Translation included. Journal of Dalian University of Technology, vol. 36, No. 3, May 1996.10 pages.

International Search Report and Written Opinion, PCT/US2012/045759, Oct. 2, 2012, 11 pages.

U.S. Patent Office Examiner's Action, U.S. Appl. No. 11/555,458, dated Aug. 3, 2011, 18 pp.

Korean Office Action, with English Translation, KR application No. 10-2009-7011230, Jun. 14, 2013, 10 pages.

\* cited by examiner

| DISTINCT KEYS | 10 | 11 | 12 | 13 | 14 | 15 | 16 | 17 | 18 | 19 | 20 | |
|---|---|---|---|---|---|---|---|---|---|---|---|---|
| 100 | 1.1% | 0.1% | | | | | | | | | | 100 |
| 200 | 8.7% | 1.1% | 0.1% | | | | | | | | | 200 |
| 500 | 54.3% | 15.1% | 2.2% | 0.2% | 0.0% | | | | | | | 500 |
| 1,000 | 92.2% | 54.3% | 15.1% | 2.2% | 0.2% | 0.0% | | | | | | 1,000 |
| 2,000 | 99.8% | 92.2% | 54.2% | 15.1% | 2.2% | 0.2% | 0.0% | | | | | 2,000 |
| 5,000 | | 100.0% | 97.0% | 69.5% | 24.7% | 4.4% | 0.5% | 0.00% | | | | 5,000 |
| 10,000 | | | 100.0% | 97.0% | 69.5% | 24.7% | 4.4% | 0.48% | 0.04% | 0.00% | | 10,000 |
| 20,000 | | | | 100.0% | 97.0% | 69.5% | 24.7% | 4.36% | 0.48% | 0.04% | 0.00% | 20,000 |
| 50,000 | | | | | 100.0% | 99.1% | 82.4% | 37.51% | 8.11% | 1.01% | 0.09% | 50,000 |
| 100,000 | | | | | | 100.0% | 99.1% | 82.39% | 37.51% | 8.11% | 1.01% | 100,000 |
| 200,000 | | | | | | | 100.0% | 99.11% | 82.39% | 37.51% | 8.11% | 200,000 |
| 500,000 | | | | | | | 100.0% | 100.00% | 99.81% | 91.47% | 52.58% | 500,000 |
| 1,000,000 | | | | | | | | 100.00% | 100.00% | 99.81% | 91.47% | 1,000,000 |
| 2,000,000 | | | | | | | | | 100.00% | 100.00% | 99.81% | 2,000,000 |
| 5,000,000 | | | | | | | | | | 100.00% | 100.00% | 5,000,000 |
| 10,000,000 | | | | | | | | | | | 100.00% | 10,000,000 |
| | 10 | 11 | 12 | 13 | 14 | 15 | 16 | 17 | 18 | 19 | 20 | | log$_2$(SIZE)

FIG. 3A

| DISTINCT KEYS | 21 | 22 | 23 | 24 | 25 | 26 | 27 | 28 | |
|---|---|---|---|---|---|---|---|---|---|
| 20,000 | 0.00% | 0.00% | | | | | | | 20,000 |
| 50,000 | 0.01% | 0.00% | 0.00% | | | | | | 50,000 |
| 100,000 | 0.09% | 0.01% | 0.00% | 0.00% | | | | | 100,000 |
| 200,000 | 1.01% | 0.09% | 0.01% | 0.00% | 0.00% | | | | 200,000 |
| 500,000 | 14.28% | 2.07% | 0.20% | 0.02% | 0.00% | 0.00% | | | 500,000 |
| 1,000,000 | 52.58% | 14.28% | 2.07% | 0.20% | 0.02% | 0.00% | 0.00% | | 1,000,000 |
| 2,000,000 | 91.47% | 52.58% | 14.28% | 2.07% | 0.20% | 0.02% | 0.00% | 0.00% | 2,000,000 |
| 5,000,000 | 99.97% | 96.65% | 67.93% | 23.52% | 4.06% | 0.46% | 0.04% | 0.00% | 5,000,000 |
| 10,000,000 | 100.00% | 99.97% | 96.65% | 67.93% | 23.52% | 4.06% | 0.44% | 0.04% | 10,000,000 |
| 20,000,000 | 100.00% | 100.00% | 99.97% | 96.65% | 67.93% | 23.52% | 4.06% | 0.44% | 20,000,000 |
| 50,000,000 | | 100.00% | 100.00% | 100.00% | 98.97% | 81.18% | 36.01% | 7.61% | 50,000,000 |
| 100,000,000 | | | 100.00% | 100.00% | 100.00% | 98.97% | 81.18% | 36.01% | 100,000,000 |
| | 21 | 22 | 23 | 24 | 25 | 26 | 27 | 28 | | log$_2$(SIZE)

MANAGING STORAGE OF INDIVIDUALLY ACCESSIBLE DATA UNITS

CLAIM OF PRIORITY

This application is a continuation application and claims priority under 35 USC §120 to U.S. patent application Ser. No. 11/555,458 filed on Nov. 1, 2006, now U.S. Pat. No. 8,229,902, the entire contents of which are hereby incorporated by reference.

BACKGROUND

The invention relates to managing storage of individually accessible data units.

A database system can store individually accessible unit of data or "records" in any of a variety of formats. Each record may correspond to a logical entity such as a credit card transaction and typically has an associated primary key used to uniquely identify the record. The record can include multiple values associated with respective fields of a record format. The records can be stored within one or more files (e.g., flat files or structured data files such as XML files). In compressed database systems individual records or values within records may be compressed when stored and decompressed when accessed to reduce the storage requirements of the system.

SUMMARY

In one aspect, in general, a method for managing data includes receiving individually accessible data units, each identified by a key value; storing a plurality of blocks of data, each of at least some of the blocks being generated by combining a plurality of the data units; and providing an index that includes an entry for each of the blocks. One or more of the entries enable location, based on a provided key value, of a block that includes data units corresponding to a range of key values that includes the provided key value.

In another aspect, in general, a system for managing data includes means for receiving individually accessible data units, each identified by a key value; means for storing a plurality of blocks of data, each of at least some of the blocks being generated by combining a plurality of the data units; and means for providing an index that includes an entry for each of the blocks. One or more of the entries enable location, based on a provided key value, of a block that includes data units corresponding to a range of key values that includes the provided key value.

In another aspect, in general, a computer program, stored on a computer-readable medium, for managing data, includes instructions for causing a computer to receive individually accessible data units, each identified by a key value; store a plurality of blocks of data, each of at least some of the blocks being generated by combining a plurality of the data units; and provide an index that includes an entry for each of the blocks. One or more of the entries enable location, based on a provided key value, of a block that includes data units corresponding to a range of key values that includes the provided key value.

Aspects can include one or more of the following features.

At least some of the blocks are generated by combining the data units based on a defined order for the key values.

The defined order is alphabetical.

The defined order is numerical.

Respective blocks are generated from respective sets of data units, and the sets correspond to non-overlapping ranges of key values according to the defined order.

One or more of the entries in the index identify a range of key values corresponding to data units from which a corresponding block was generated.

The range of key values is identified by information including at least one extremum of the range of key values.

The range of key values is identified by a first extremum from a first entry in the index and a second extremum from a second entry in the index.

The range of key values is identified by information including at least one extremum of the key values associated with the data units from which the corresponding block was generated.

The range of key values is identified by a first extremum from a first entry in the index and a second extremum from a second entry in the index.

Each of at least some of the entries in the index identifies a storage location of the corresponding block.

Generating a block by combining a plurality of the data units comprises compressing a set of data units.

Decompressing a block generated by compressing a set of data units data units includes processing the entire block.

The data units are records that each have one or more values associated with corresponding fields.

A key value that identifies a received data unit corresponds to one or more fields associated with the given data unit before being received.

A key value that identifies a received data unit is assigned to the data unit after being received.

Key values are assigned monotonically.

Key values are assigned sequentially.

The stored blocks of data are stored as a first set of blocks.

The first set of blocks are stored in a file.

A second set of one or more blocks of data is stored, each of at least some of the blocks in the second set being generated from a plurality of data units received after storing the first set of blocks.

At least some of the blocks in the second set are generated by compressing a set of data units.

An index is provided that includes an entry for each of the blocks in the second set, wherein one or more of the entries enable location, based on a provided key value, of a block that includes data units corresponding to a range of key values that includes the provided key value.

The first and second sets of blocks are processed to recover the data units from which the blocks were generated; the data units recovered from the first set and the data units recovered from the second set are sorted according to an order for key values corresponding to the data units to generate a set of sorted data units; and a third set of blocks is generated, each of at least some of the blocks in the third set being generated by combining a plurality of the sorted data units.

Sorting the data units recovered from the first set and the data units recovered from the second set includes merging the data units recovered from the first set with the data units recovered from the second set according to an order for key values corresponding to the data units to generate a set of sorted data units An index for the third set is provided that includes an entry for each of the blocks in the third set, wherein one or more of the entries enable location, based on a provided key value, of a block that includes data units corresponding to a range of key values that includes the provided key value.

A screening data structure associated with the stored blocks is provided for determining a possibility that a data unit that includes a given attribute value was included in the data units from which the blocks were generated.

The attribute value includes a key value that identifies a data unit.

The screening data structure determines, for a given attribute value, either that a data unit including the given attribute value was definitely not included, or that a data unit including the given attribute value was possibly included.

The probability that the screening data structure determines that a data unit including the given attribute value was possibly included when the data unit was not included depends on the size of the data structure.

The size of the screening data structure is selected based on the number of data units from which the blocks were generated.

A secondary index associated with the stored blocks is provided for determining one or more key values of data units that include a given attribute value.

The data units are records that each have one or more values associated with corresponding fields, the key value identifying a record corresponds to a primary key value, and the attribute value associated with the secondary index corresponds to a secondary key value.

The secondary index includes a table having rows sorted by attribute values in the data units other than the key values.

Aspects can include one or more of the following advantages.

By compressing a block of multiple records, a greater degree of compression can be achieved than by compressing the records individually. The indexed blocks provide the ability to access a given record without requiring decompression from the beginning of a file of compressed records. The size of the blocks can be selected to be large enough to provide high compression and small enough to limit the amount of decompression necessary to access a given record within a block. Each block can be compressed using a compression technique that does not need to provide the ability to start decompression from an arbitrary location within the compressed block. Thus, techniques that provide a large degree of compression can be used.

By storing an index that identifies a range of key values corresponding to records from which a corresponding block was generated, the index can remain small (e.g., small enough to fit in a relatively fast memory) since it does not need to have an entry for each record. The index entries enable location of one or more blocks that can be loaded and decompressed to recover a set of records that can be searched for a desired record. Associating signatures with compressed blocks can indicate that a desired record is not present obviating the need to load the compressed block to search for the record.

Other features and advantages will become apparent from the following description, and from the claims.

DESCRIPTION OF DRAWINGS

FIGS. 3A and 3B are tables showing false positive probabilities for different signature sizes.

DESCRIPTION

Figure 1:
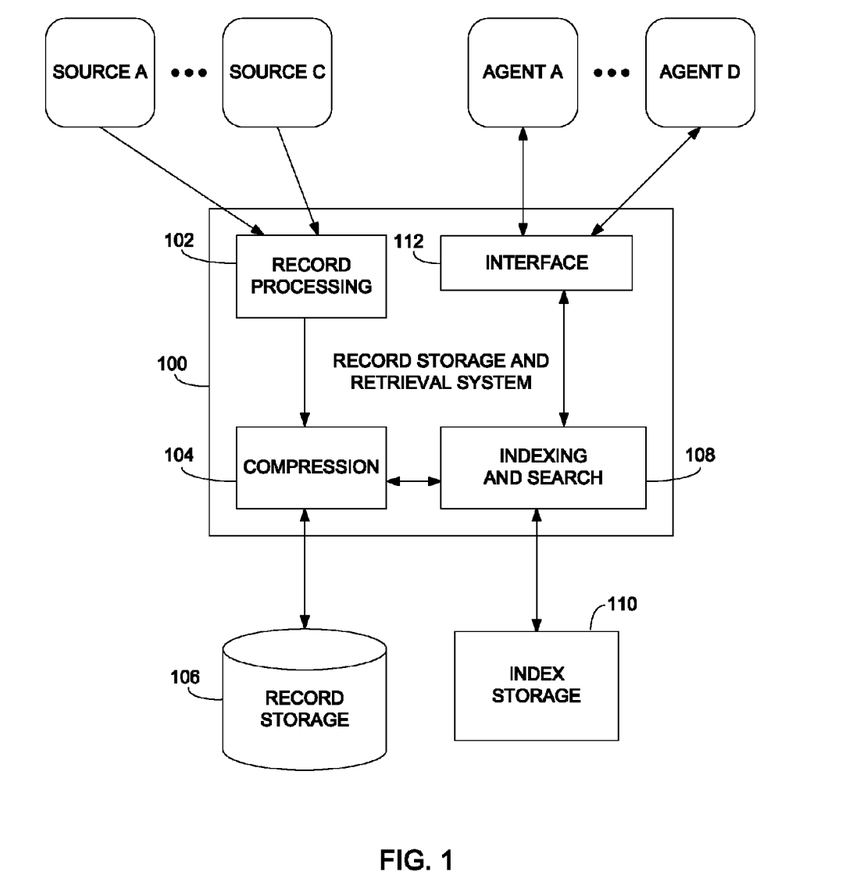
FIG. 1 is a block diagram of a system for storing and retrieving records.

Referring to FIG. 1, a record storage and retrieval system 100 accepts data from one or more sources, such as SOURCE A-SOURCE C. The data include information that can be represented as individually accessible units of data. For example, a credit card company may receive data representing individual transactions from various retail companies. Each transaction is associated with values representing attributes such as a customer name, a date, a purchase amount, etc. A record processing module 102 ensures that the data is formatted according to a predetermined record format so that the values associated with a transaction are stored in a record. In some cases this may include transforming the data from the sources according to the record format. In other cases, one or more sources may provide the data already formatted according to the record format.

The record processing module 102 sorts the records by a primary key value that identifies each record (e.g., either a unique key identifying a single record, or a key that identifies multiple updated versions of a record), and divides the records into sets of records that correspond to non-overlapping ranges of primary key values. For example, each set of records may correspond to a predetermined number of records (e.g., 100 records). A compression module 104 compresses each set of records into a compressed block of data. These compressed blocks are stored in a compressed record file in a record storage 106 (e.g., in a non-volatile storage medium such as one or more hard disk drives). The system 100 also includes an indexing and search module 108 that provides an index that includes an entry for each of the blocks. The index is used to locate a block that may include a given record, as described in more detail below. The index can be stored in an index file in an index storage 110. For example, while the index file can be stored in the same storage medium as the compressed record file, the index file may preferably be stored in a relatively faster memory (e.g., a volatile storage medium such as a Dynamic Random Access Memory) since the index file is typically much smaller than the compressed record file.

In alternative implementations of the system 100, the sets of records can be processed to generate blocks using other functions in addition to or instead of compression to combine the records in some way (i.e., so that the block is not merely a concatenated set of records). For example, some systems may process a set of records to generate blocks of encrypted data.

An interface module 112 provides access to the stored records to human and/or computer agents, such as AGENT A-AGENT D. For example, the interface module 112 can implement an online account system for credit card customers to monitor their transactions. A request for transaction information meeting various criteria can be processed by the system 100 and corresponding records can be retrieved from within compressed blocks stored in the record storage 106.

Figure 2A:
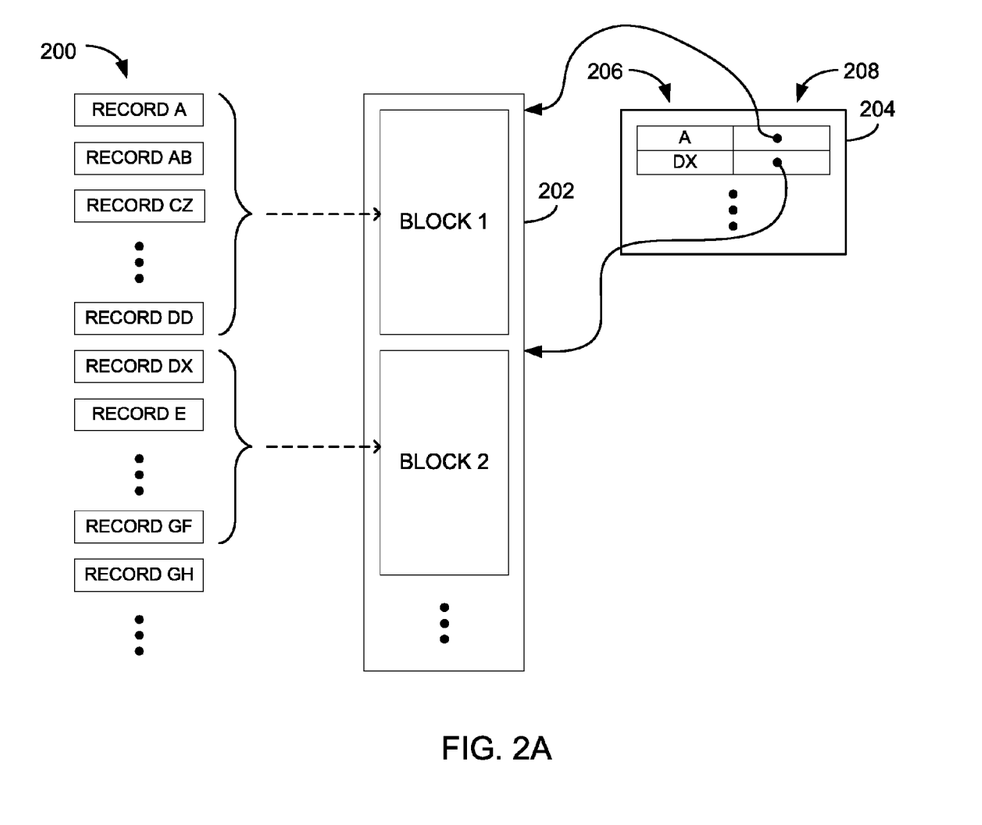
FIGS. 2A, 2B, 2C, and 2D are schematic diagrams of data processed by and stored in the system.

A stream of incoming records from one or more sources may be temporarily stored before being processed to generate a compressed record file. Referring to FIG. 2A, the system 100 receives a set of records 200 to be stored in a compressed record file, and sorts the records according to values of a primary key.

A primary key value can uniquely identify a given item in a database that may be represented by one or more records (e.g., each record having a given primary key value may correspond to a different updated version of the item). The primary key can be a "natural key" that corresponds to one or more existing fields of a record. If there is no field that is guaranteed to be unique for each item, the primary key may be a compound key comprising multiple fields of a record that together are guaranteed or highly likely to be unique for each item. Alternatively, the primary key can be a "synthetic key"

which can be assigned to each record after being received. For example, the system 100 can assign unique primary key values as sequentially incremented integers, or some other sequence of monotonically progressing values (e.g., time stamps). In this case, records representing different versions of the same item may be assigned different synthetic key values. If integers are used, the range of possible primary key values (e.g., as determined by the number of bits used) can be large enough so that if the primary key rolls over, any record previously assigned a given primary key value has been removed from the compressed record file. For example, old transactions may be removed and archived or discarded.

In the example shown in FIG. 2A, the records 200 are identified by alphabetically sorted primary key values: A, AB, CZ, . . . . The system 100 compresses a first set of N records having primary key values A-DD to generate a corresponding compressed block labeled BLOCK 1. The next set of records includes the next N of the sorted records having primary key values DX-GF. The compression module 104 can use any of a variety of lossless data compression algorithms (e.g., Lempel-Ziv type algorithms). Each successive compressed block is combined form a compressed record file 202.

The number N of records used to generate a compressed block, can be selected to trade off between compression efficiency and decompression speed. The compression may reduce the size of the data on average by a given factor R that depends on the nature of the data being compressed and on the size of the data being compressed (e.g., R is typically smaller when more data is being compressed). The compression may also have an associated overhead (e.g., compression related data) of average size O. The average size of the resulting compressed record file generated from M records each of size X can be expressed as $\lceil M/N \rceil(RNX+O)$, which for a large number of blocks can be approximated as $RMX+OM/N$. Thus, a larger value of N can in some cases provide greater compression both by reducing R and by reducing the contribution of the overhead to the size of the file. A smaller value of N reduces the time needed to decompress a given compressed block to access a record that may be contained in the block.

In other implementations, different compressed blocks may include different numbers of records. Each block may have a number of records according to a predetermined range. For example, the first block includes records with primary key values 1-1000, and the second block includes records with primary key values 1001-2000, etc. The number of records in the compressed blocks in this example could be different since not every primary key value necessarily exists (e.g., in the case of an existing numerical field used as a natural key).

In some implementations, different compressed blocks may include a target number of records in some cases, and in exceptional cases may include more or fewer records. For example, if a set of records ends with a record whose primary key value is different from the primary key value of the following record in the sorted order, those records are used to generate a compressed block. If the set of records ends with a record whose primary key value is the same as the primary key value of the following record in the sorted order, all the additional records having that primary key value are added to the set. In this way, the same primary key value does not cross over from one compressed block to the next.

The indexing and search module 108 generates an entry in an index file 204 for each of the compressed blocks. The index entries include a key field 206 that identifies each compressed block, for example, by the primary key of the first record in the corresponding uncompressed set of records. The entries also include a location field 208 that identifies the storage location of the identified compressed block within the compressed record file 202. For example, the location field can contain a pointer in the form of an absolute address in the record storage 106, or in the form of an offset from the address of the beginning of the compressed record file 202 in the record storage 106.

To search for a given record in the compressed record file 202, the module 108 can perform a search (e.g., a binary search) of the index file 204 based on the key field 206. For a provided key value (e.g., provided by one of the agents), the module 108 locates a block that includes records corresponding to a range of key values that includes the provided key value. The record with the provided key value may or may not have been included in the set of records used to generate the located block, but if the record existed in the records 200, that record would have been included since the records 200 were sorted by the primary key value. The module 108 then decompresses the located block and searches for a record with the provided key value. In cases in which the primary key value is not unique for each record, the module 108 may find multiple records with the provided key value in the compressed block. In this example in which the key field 206 includes the primary key of the first record in a set, the module 108 searches for two consecutive index entries that have key values earlier and later, respectively, than the provided key value, and returns the block corresponding to the entry with the earlier key value. In some cases, the provided key value may be the same as a key value in an index entry, in which case the module 108 returns the block corresponding to that entry.

In different implementations, there are different ways for the entries in the index file 204 to identify a range of key values corresponding to the records from which a corresponding block was generated. As in the implementation shown in FIG. 2A, the range of key values can be the range between the two extremum key values of the records used to generate a block (e.g., the first and last in a sorted sequence of alphabetical primary key values, or the minimum and maximum in a sorted sequence of numerical primary key values). The index entry can include either or both of the extrema that define the range. In some implementations, if the index entries include the minimum key value that defines a range for a given block, the last index entry associated with the last block in a compressed record file may also include a maximum key value that defines the range for that block. This maximum key value can then be used when searching the compressed record file to determine when a given key value is out of range.

Alternatively, the range of key values can be a range extending beyond the key values of the records used to generate a block. For example, in the case of a block generated from records with numerical primary key values between 1 and 1000, the smallest key value represented in the records may be greater than 1 and the largest key value represented in the records may be smaller than 1000. The index entry can include either or both of the extrema 1 and 1000 that define the range.

When additional records arrive after an initial group of records have been processed to generate a compressed record file, those records can be stored in a buffer and searched in uncompressed form. Alternatively, additional groups of records can be incrementally processed and stored as additional compressed record files accessible by additional index files. In some cases, even when compressing a small number of additional records may not provide a great reduction in storage size, it may still be advantageous to compress the additional records to maintain uniform procedures for accessing records. Additional records can be processed repeatedly at regular intervals of time (e.g., every 30 seconds or every 5 minutes), or after a predetermined number of additional records have been received (e.g., every 1000 records or every 10,000 records). If incoming records are processed based on time intervals, in some intervals there may be no incoming records or a small number of records that are all compressed into a single compressed block.

Figure 2B:
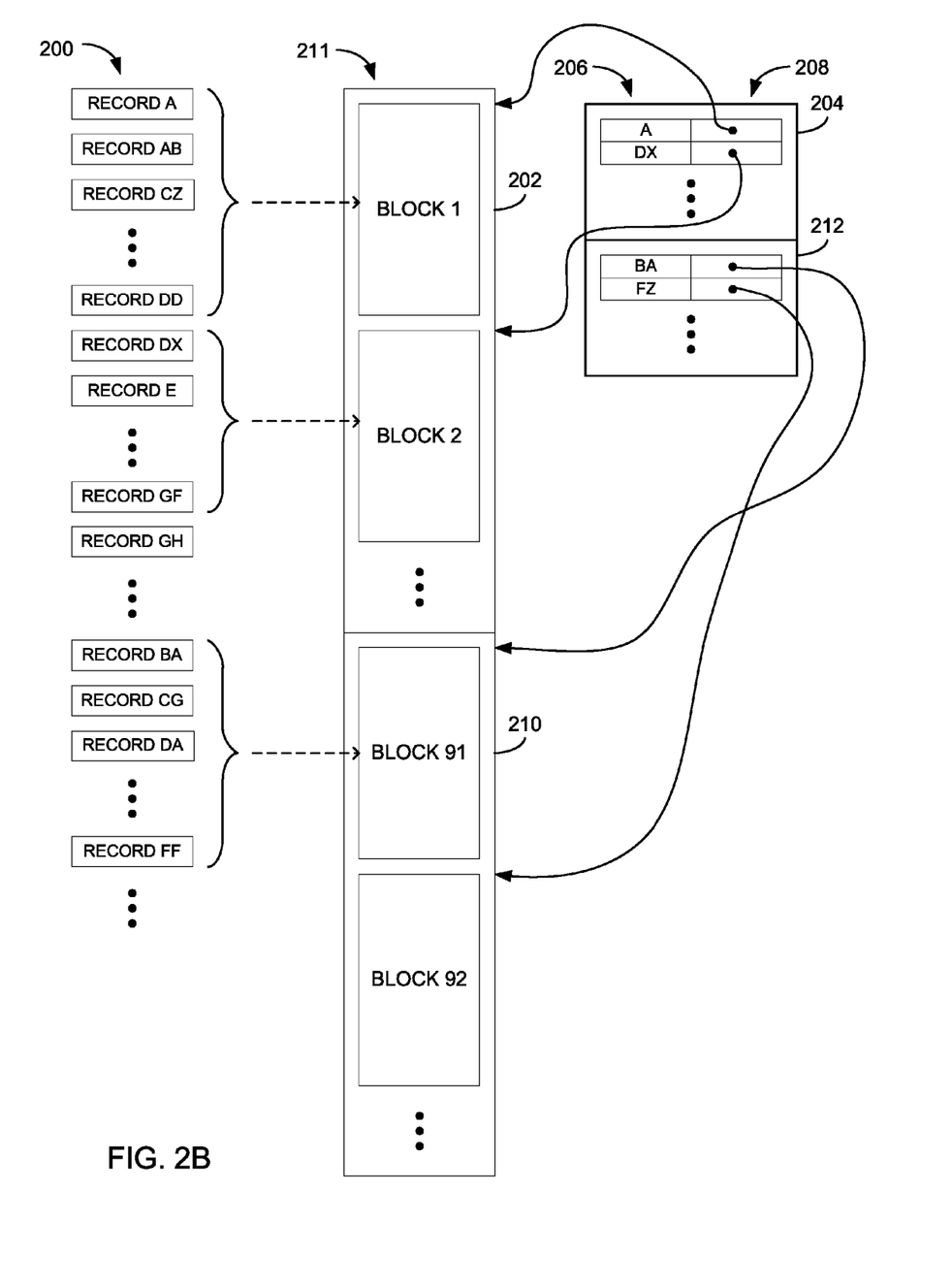

Referring to FIG. 2B, in an example in which additional records have been received by the system 100 after the initial compressed record file 202 has been generated, an additional compressed record file 210 can be appended to the initial compressed record file 202 to form a compound compressed record file 211. The system 100 sorts the additional records by primary key values and compresses sets of N records to generate compressed blocks of the compressed record file 210. The first compressed block in the appended file 210 labeled BLOCK 91 has primary key values BA-FF. The module 108 generates an additional index file 212 that includes entries that can be used to search for the additional records represented within the appended file 210. The new index file 212 can be appended to the previous index file 204.

Any number of compressed record files can be appended to form a compound compressed record file. If the indexing and search module 108 is searching for a record with a given key value within a compound compressed record file, the module 108 searches for the record within each of the appended compressed record files using the corresponding index files. Alternatively, an agent requesting a given record can specify some number of the compressed record files with a compound compressed record file to be searched (e.g., the 10 most recently generated, or any generated within the last hour).

After a given amount of time (e.g., every 24 hours) or after a given number of compressed record files have been appended, the system 100 can consolidate the files to generate a single compressed record file from a compound compressed record file and a new corresponding index file. After consolidation, a single index can be searched to locate a compressed block that may contain a given record, resulting in more efficient record access. At consolidation time, the system 100 decompresses the compressed record files to recover the corresponding sets of sorted records, sorts the records by primary key values, and generates a new compressed record file and index. Since each of the recovered sets of records is already sorted, the records can be sorted efficiently by merging the previously sorted lists according to the primary key values to generate a single set of sorted records.

Figure 2C:
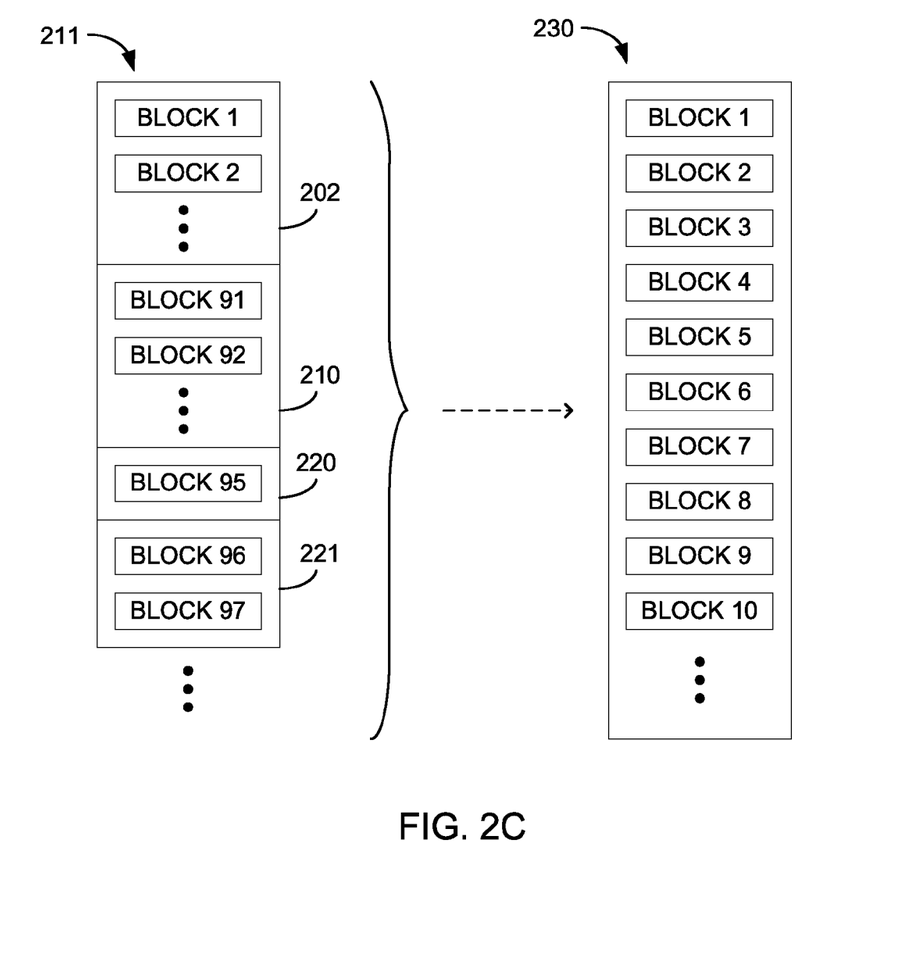

Referring to FIG. 2C, the compound compressed record file 211 includes the initial compressed record file 202, the additional compressed record file 210, and number of additional compressed record files 220, 221, ... depending on how many additional records have arrived and how often the records have been processed. Each compressed record file can have an associated index file that can be used to search for a given record in within the compressed blocks of that file. In this example, one of the compressed record files 220 is small enough to have only a single compressed block (BLOCK 95), and therefore does not necessarily need an associated index file, but can have associated data that indicates a range of primary key values in the block and its location in storage. After consolidation, the records recovered from the different appended compressed record files are processed to generate a single compressed record file 230.

Figure 2D:
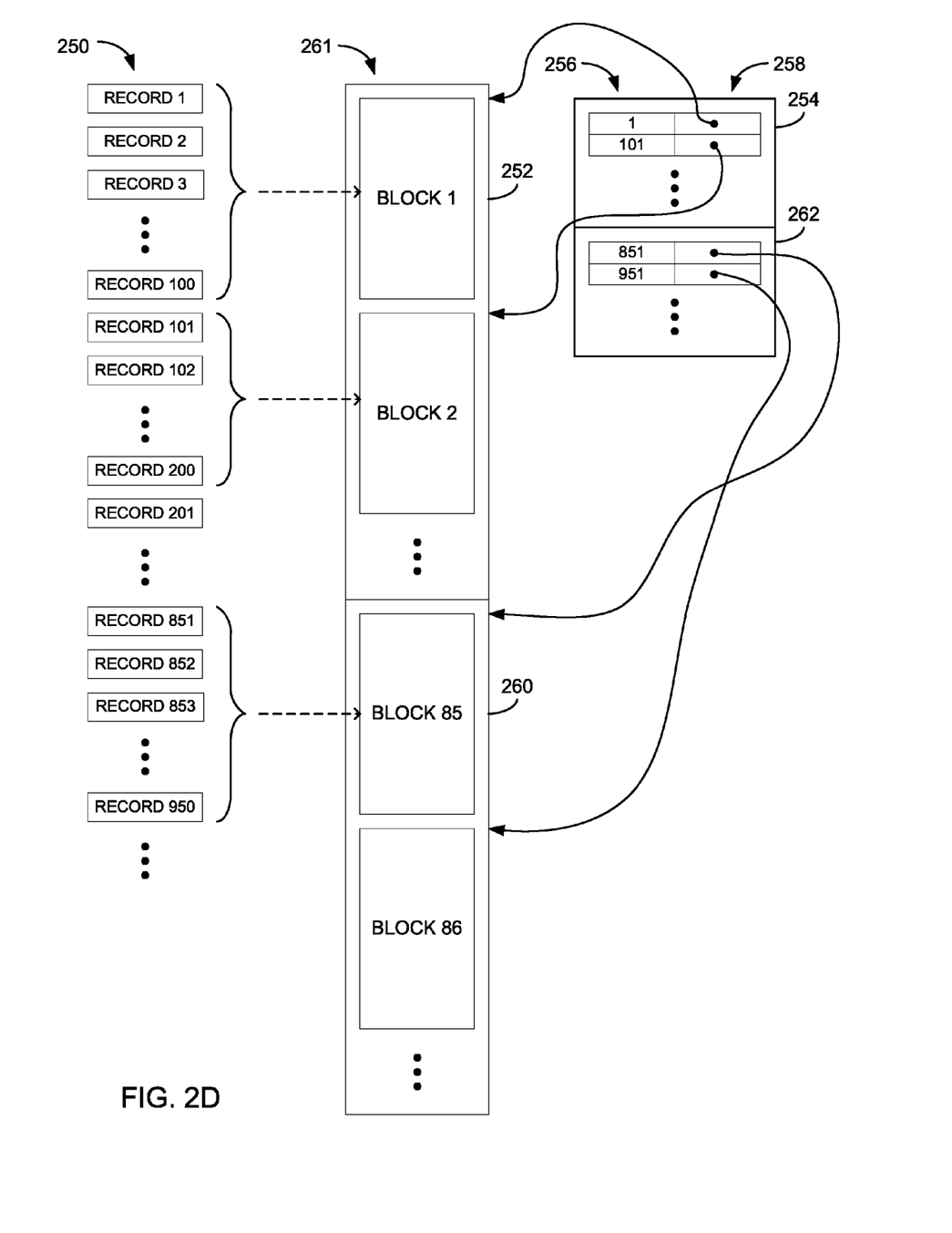

In the case of monotonically assigned primary keys, records are automatically sorted not only within compressed record files, but also from one file to the next, obviating the need to consolidate files in order to access a record in a single index search. Referring to FIG. 2D, the system 100 receives a set of records 250 that are identified by consecutive integers assigned in arrival order as primary keys for the records. Thus, the records 250 are automatically sorted by primary key. An initial compressed record file 252 includes compressed blocks each including 100 records in this example, and an index file 254 includes a key field 256 for the primary key value of the first record in a compressed block and a location field 258 that identifies the corresponding storage location. Since records that arrive after the initial compressed record file 252 has been generated will automatically have primary key values later in the sorted order, an appended compressed record file 260 and corresponding index file 262 do not need to be consolidated to enable efficient record access based on a single index search. For example, the index file 262 can simply be appended to the index file 254 and both indices can be searched together (e.g., in a single binary search) for locating a compressed block in either of the compressed record files 252 or 260.

The compound compressed record file 261 may optionally be consolidated to eliminate an incomplete block that may have been inserted at the end of the compressed record file 252. In such a consolidation, only the last compressed block in the first file 252 would need to be decompressed, and instead of merging the decompressed sets of records, the sets of records could simply be concatenated to form a new sorted set of records to be divided into sets of 100 records that are then compressed again to form a new compressed record file.

Another advantage of using a consecutive integer synthetic primary key values is that if the records are going to be partitioned based on the primary key value, the partitions can be automatically balanced since there are no gaps in the key values.

Any of a variety of techniques can be used to update records and invalidate any previous versions of the record that may exist in a compressed record file. In some cases, records don't need to be removed or updated individually (e.g., logs, transactions, telephone calls). In these cases, old records be removed and discarded or archived in groups of a predetermined number of compressed blocks, for example, from the beginning of a compressed record file. In some cases, entire compressed record files can be removed.

In some cases, one or more values of a record are updated by adding a new updated record for storage in a compressed block, and a previously received version of the record (with the same primary key value) may be left stored in a different compressed block. There could then multiple versions of a record and some technique is used to determine which is the valid version of the record. For example, the last version (most recently received) appearing in any compressed record file may be implicitly or explicitly indicated as the valid version, and any other versions are invalid. A search for a record with a given primary key in this case can include finding the last record identified by that primary key in order of appearance. Alternatively, a record can be invalidated without necessarily adding a new version of a record by writing an "invalidate record" that indicates that any previous versions of the record are not valid.

The system 100 mediates access to the compressed record files stored in the record storage 106 by different processes. Any of a variety of synchronization techniques can be used to mediate access to the compressed blocks within one or more compressed record files. The system 100 ensures that any processes that modify the files (e.g., by appending or consolidating data) do not interfere with one another. For example, if new records arrive while consolidation is occurring, the system 100 can wait until the consolidation process is finished, or can generate compressed blocks and store them temporarily before appending them to existing compressed record files. Processes that read from a compressed record file can load a portion of the file that is complete, and can ignore any incomplete portion that may be undergoing modification.

The system 100 stores additional data that enables a search for record based on an attribute of the record other than the primary key. A secondary index for a compressed record file includes information that provides one or more primary key values based on a value of an attribute that is designated as a secondary key. Each attribute designated as a secondary key can be associated with a corresponding secondary index. For example, each secondary index can be organized as a table that has rows sorted by the associated secondary key. Each row includes a secondary key value and one or more primary key values of records that include that secondary key value. Thus, if an agent initiates a search for any records that include a given secondary key value, the system 100 looks up the primary key(s) to use for searching the index of the compressed record file for the compressed block(s) that include the record(s). The secondary index may be large (e.g., on the order of the number of records) and in some cases may be stored in the storage medium that stores the compressed record files.

In some cases, the values of an attribute designated as a secondary key may be unique for each record. In such cases, there is a one-to-one correspondence between that secondary key and the primary key, and the interface module 112 can present that secondary key attribute as though it were the primary key to an agent.

Each secondary index can be updated as new compressed record files are appended to a compound compressed record file. Alternatively, a secondary key can be associated with a different secondary index for each compressed record file, and the secondary indices can be consolidated into a single secondary index when the compressed record files are consolidated.

A screening data structure can be associated with a compressed record file for determining the possibility that a record that includes a given attribute value is included in a compressed block of the file. For example, using an overlap encoded signature (OES) as a screening data structure enables the system 100 to determine that a record with a given key value (primary key or secondary key) is definitely not present (a "negative" result), or whether a record with the given key value has the possibility of being present (a "positive" result). For a positive result, the system accesses the appropriate compressed block to either retrieve the record (a "confirmed positive" result), or determine that the record is not present (a "false positive" result). For a negative result, the system can give a negative result to an agent without needing to spend time decompressing and searching the compressed block for a record that is not present. The size of the OES affects how often positive results are false positives, with larger OES size yielding fewer false positive results in general. For a given OES size, fewer distinct possible key values yields fewer false positives in general.

Other types of screening data structures are possible. A screening data structure for a given primary or secondary key can be provided for each compressed record file. Alternatively, a screening data structure for a key can be provided for each compressed block.

FIGS. 3A and 3B show tables that provide probability values for obtaining a false positive result for a key value for various sizes of an exemplary OES screening data structure (columns) and various numbers of distinct key values represented in the compressed record file (rows). For an OES, depending on the size of the OES and the number of distinct key values, the presence of more than one key value may be indicated in the same portion of the OES, potentially leading to a false positive result for one of those key values if the other is present. The size of this exemplary OES varies from $2^{10}=1024$ bits (in the table of FIG. 3A) to $2^{28}=256$ Mbits (in the table of FIG. 3B). The number of distinct key values varies from 100 (in the table of FIG. 3A) to 100,000,000 (in the table of FIG. 3B). For both tables, the blank cells in the upper right correspond to 0% and the blank cells in the lower left correspond to 100%. For the cells in which the false positive probability is low (e.g., near zero), the screening data structure may be larger than necessary to provide adequate screening. For the cells in which the false positive probability is significant (e.g., >50%), the screening data structure may be too small to provide adequate screening. This example corresponds to a technique for generating an OES using four hash codes per key value. Other examples of OES screening data structures could yield a different table of false positive probabilities for given numbers of distinct keys.

Since the number of distinct key values represented in a compressed record file may not be known, the system 100 can select the size of the screening data structure for the compressed record file based on the number of records from which the file was generated. In selecting the size, there is a trade-off between reducing false positive probabilities and memory space needed to store the screening data structure. One factor in this trade-off the likelihood of searching for absent key values. If most of the key values to be looked up are likely to be present in the decompressed records, the screening data structures may not be needed at all. If there is a significant probability that key values will not be found, then allocating storage space for relatively large screening data structures may save considerable time.

The size of a screening data structures associated with a compressed record file may depend on whether the file corresponds to an initial or consolidated large database of records, or a smaller update to a larger database. A relatively smaller screening data structure size can be used for compressed record files that are appended during regular update intervals since there are generally fewer distinct key values in each update. Also, the small size can reduce the storage space needed as the number of compressed record files grows after many updates. The size of the screening data structure can be based on the expected number of records and/or distinct key values in an update, and on the expected number of updates. For example, if updated files are appended every five minutes through a 24-hour period, there will be 288 compressed record files at the end of the day. The probability of at least one false positive result will be 288 times the appropriate value from the tables of FIGS. 3A and 3B (assuming the results for different updates are independent). After consolidation, a larger screening data structure may be appropriate for the consolidated compressed record file since the number of distinct key values may increase significantly.

A compressed record file can have a screening data structure for the primary key and for each secondary key, or for some subset of the keys. For example, the system 100 may provide a screening data structure for the primary key, and for only those secondary keys that are expected to be used most often in searching for records.

Figure 4A:
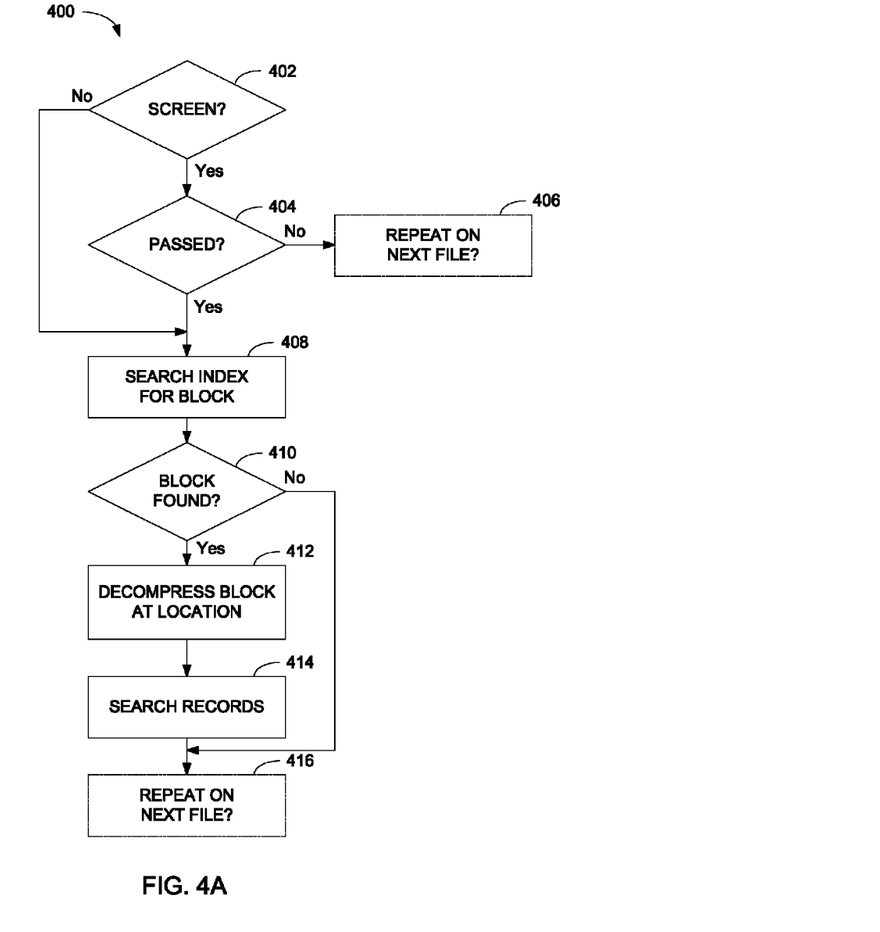
FIGS. 4A and 4B are flowcharts of procedures for searching for records.

FIG. 4A shows a flowchart for a procedure 400 for searching for one or more records with a given primary key value. The procedure 400 determines 402 whether there is a screening data structure associated with a first compressed record file. If so, the procedure 400 processes 404 the screening data structure to obtain either a positive or negative result. If the given primary key value does not pass the screening (a negative result), then the procedure 400 checks 406 for a next compressed record file and repeats on that file if it exists. If the given primary key value does pass the screening (a positive result), then the procedure 400 searches 408 the index for a block that may contain a record with the given primary key value. If no screening data structure is associated with the compressed record file, then the procedure 400 searches 408 the index without performing a screening.

After searching 408 the index, if a compressed block associated with a range of key values that includes the given primary key value is found 410, then the procedure 400 decompresses 412 the block at the location identified by the index entry and searches 414 the resulting records for one or more records with the given primary key value. The procedure then checks 416 for a next compressed record file and repeats on that file if it exists. If no compressed block is found (e.g., if the given primary key value is smaller than the minimum key value in the first block or greater than the maximum key value in the last block), then the procedure 400 checks 416 for a next compressed record file and repeats on that file if it exists.

Figure 4B:
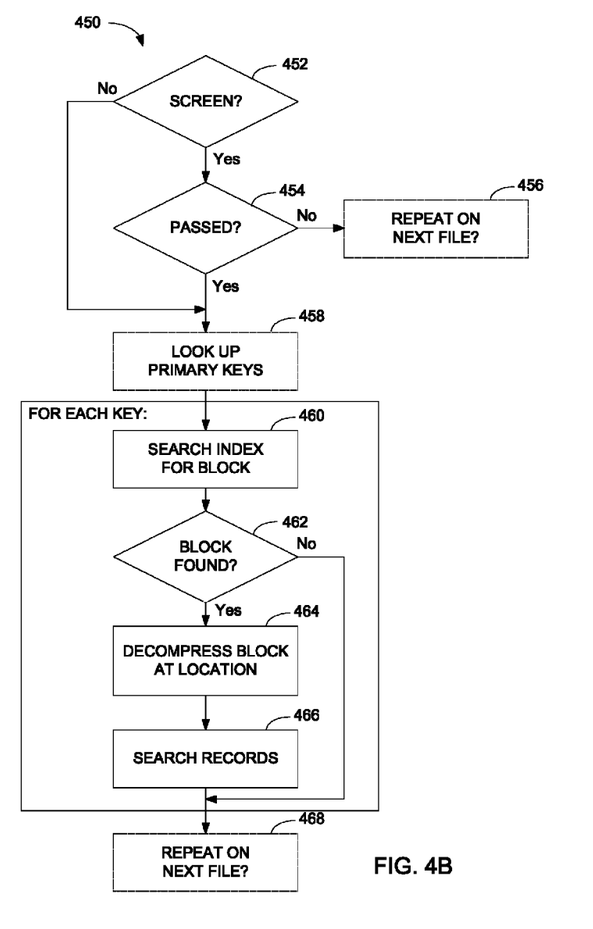

FIG. 4B shows a flowchart for a procedure 450 for searching for one or more records with a given secondary key value. The procedure 450 determines 452 whether there is a screening data structure associated with a first compressed record file. If so, the procedure 450 processes 454 the screening data structure to obtain either a positive or negative result. If the given secondary key value does not pass the screening (a negative result), then the procedure 450 checks 456 for a next compressed record file and repeats on that file if it exists. If the given secondary key value does pass the screening (a positive result), then the procedure 450 looks up 458 the primary keys that correspond to records containing the given secondary key. If no screening data structure is associated with the compressed record file, then the procedure 450 looks up 458 the primary keys without performing a screening.

For each of the primary keys found, the procedure 450 searches 460 the index for a block that may contain a record with the given primary key value. After searching 460 the index, if a compressed block associated with a range of key values that includes the given primary key value is found 462, then the procedure 450 decompresses 464 the block at the location identified by the index entry and searches 466 the resulting records for one or more records with the given primary key value. The procedure then checks 468 for a next compressed record file and repeats on that file if it exists. If no compressed block is found, then the procedure 450 checks 468 for a next compressed record file and repeats on that file if it exists.

Multiple records found with a given primary or secondary key can be returned by procedure 400 or procedure 450 in order of appearance, or in some cases, only the last version of the record is returned.

The record storage and retrieval approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing data, the method including:

receiving individually accessible data units, each data unit identified by a respective key value;

storing a plurality of sets of blocks of data that comprise a first set of the blocks and a second set of the blocks, the first set of the blocks having a plurality of blocks of data and being generated by compressing a plurality of the data units, the second set of the blocks having one or more blocks of data and being generated by compressing a plurality of data units received after storing the first set of blocks;

decompressing the first and second sets of blocks to recover the data units from which their respective blocks were generated;

sorting the data units recovered from the first set and the data units recovered from the second set according to an order for key values corresponding to the data units to generate a set of sorted data units;

generating a third set of blocks, each of at least some of the blocks in the third set being generated by compressing a plurality of the sorted data units; and providing a screening data structure associated with the stored blocks for determining a possibility that a data unit that includes a given attribute value was included in the data units from which the blocks were generated, wherein the screening data structure determines, for a given attribute value, either that a data unit including the given attribute value was definitely not included, or that a data unit including the given attribute value was possibly included.

2. The method of claim 1, wherein at least some of the blocks are generated by compressing the data units based on a defined order for the key values.

3. The method of claim 2, wherein the defined order is alphabetical.

4. The method of claim 2, wherein the defined order is numerical.

5. The method of claim 2, wherein respective blocks are generated from respective sets of data units, and the sets correspond to non-overlapping ranges of key values according to the defined order.

6. The method of claim 1, wherein decompressing a block generated by compressing a set of data units data units includes processing the entire block.

7. The method of claim 1, wherein the data units are records that each has one or more values associated with corresponding fields.

8. The method of claim 7, wherein a key value that identifies a received data unit corresponds to one or more fields associated with the given data unit before being received.

9. The method of claim 7, wherein a key value that identifies a received data unit is assigned to the data unit after being received.

10. The method of claim 9, wherein key values are assigned monotonically.

11. The method of claim 10, wherein key values are assigned Sequentially.

12. The method of claim 1, wherein the first set of blocks are stored in a file.

13. The method of claim 1, comprising providing a first index that includes an entry for each of the blocks of the first set of blocks; providing a second index that includes an entry for each of the blocks of the second set of blocks; and after the third set of blocks is generated, generating a third index to replace the first and second indices for searching within the third set of blocks.

14. The method of claim 13, wherein one or more of the entries in the index identify a range of key values corresponding to data units from which a corresponding block was generated.

15. The method of claim 14, wherein the range of key values is identified by information including at least one extremum of the range of key values.

16. The method of claim 15, wherein the range of key values is identified by a first extremum from a first entry in the index and a second extremum from a second entry in the index.

17. The method of claim 14, wherein the range of key values is identified by information including at least one extremum of the key values associated with the data units from which the corresponding block was generated.

18. The method of claim 17, wherein the range of key values is identified by a first extremum from a first entry in the index and a second extremum from a second entry in the index.

19. The method of claim 14, wherein each of at least some of the entries in the index identifies a storage location of the corresponding block.

20. The method of claim 13, wherein one or more of the entries of the first index enable location, based on a provided key value, of a block that includes data units corresponding to a range of key values that includes the provided key value.

21. The method of claim 13, wherein one or more of the entries of the second index enable location, based on a provided key value, of a block that includes data units corresponding to a range of key values that includes the provided key value.

22. The method of claim 13, wherein the third index includes an entry for each of the blocks in the third set, wherein one or more of the entries enable location, based on a provided key value, of a block that includes data units corresponding to a range of key values that includes the provided key value.

23. The method of claim 13, further including providing a screening data structure associated with the stored blocks for determining a possibility that a data unit that includes a given attribute value was included in the data units from which the blocks were generated, wherein the attribute value includes a key value that identifies a data unit.

24. The method of claim 13, further including providing a secondary index associated with the stored blocks in the first set of blocks for determining one or more key values of data units that include a given attribute value.

25. The method of claim 24, wherein the data units are records that each has one or more values associated with corresponding fields, the key value identifying a record corresponds to a primary key value, and the attribute value associated with the secondary index corresponds to a secondary key value.

26. The method of claim 24, wherein the secondary index includes a table having rows sorted by attribute values in the data units other than the key values.

27. The method of claim 13, wherein sorting the data units recovered from the first set and the data units recovered from the second set includes merging the data units recovered from the first set with the data units recovered from the second set according to an order for key values corresponding to the data units to generate the set of sorted data units.

28. The method of claim 1, wherein the probability that the screening data structure determines that a data unit including the given attribute value was possibly included when the data unit was not included depends on the size of the data structure.

29. The method of claim 28, further including selecting the size of the screening data structure based on the number of data units from which the blocks were generated.

30. A system for managing data, the system including:
an input device or port for receiving individually accessible data units, each data unit identified by a respective key value;
a data storage system for storing a plurality of sets of blocks of data that comprise a first set of the blocks and a second set of the blocks, the first set of the blocks having a plurality of blocks of data and being generated by compressing a plurality of the data units, the second set of the blocks having one or more blocks of data and being generated by compressing a plurality of data units received after storing the first set of blocks;
means for processing plurality of sets of blocks of data units, the means for processing comprising a processor, the processing including:
decompressing the first and second sets of blocks to recover the data units from which the blocks were generated;
sorting the data units recovered from the first set and the data units recovered from the second set according to an order for key values corresponding to the data units to generate a set of sorted data units;
generating a third set of blocks, each of at least some of the blocks in the third set being generated by compressing a plurality of the sorted data units; and
providing a screening data structure associated with the stored blocks for determining a possibility that a data unit that includes a given attribute value was included in the data units from which the blocks were generated, wherein the screening data structure determines, for a given attribute value, either that a data unit including the given attribute value was definitely not included, or that a data unit including the given attribute value was possibly included.

31. The system of claim 30, wherein the processing further includes providing a first index that includes an entry for each of the blocks of the first set of blocks; providing a second index that includes an entry for each of the blocks of the second set of blocks; and after the third set of blocks is generated, generating a third index to replace the first and second indices for searching within the third set of blocks.

32. The system of claim 31, wherein one or more of the entries of the first index enable location, based on a provided key value, of a block that includes data units corresponding to a range of key values that includes the provided key value.

33. The system of claim 31, wherein one or more of the entries of the second index enable location, based on a provided key value, of a block that includes data units corresponding to a range of key values that includes the provided key value.

34. The system of claim 33, wherein one or more of the entries in the index identify a range of key values corresponding to data units from which a corresponding block was generated.

35. The system of claim 34, wherein the range of key values is identified by information including at least one extremum of the range of key values.

36. The system of claim 35, wherein the range of key values is identified by a first extremum from a first entry in the index and a second extremum from a second entry in the index.

37. The system of claim 34, wherein the range of key values is identified by information including at least one extremum of the key values associated with the data units from which the corresponding block was generated.

38. The system of claim 37, wherein the range of key values is identified by a first extremum from a first entry in the index and a second extremum from a second entry in the index.

39. The system of claim 34, wherein each of at least some of the entries in the index identifies a storage location of the corresponding block.

40. The system of claim 31, wherein the third index includes an entry for each of the blocks in the third set, wherein one or more of the entries enable location, based on a provided key value, of a block that includes data units corresponding to a range of key values that includes the provided key value.

41. The system of claim 31, wherein the processing further includes providing a screening data structure associated with the stored blocks for determining a possibility that a data unit that includes a given attribute value was included in the data units from which the blocks were generated, wherein the attribute value includes a key value that identifies a data unit.

42. The system of claim 30, wherein at least some of the blocks are generated by compressing the data units based on a defined order for the key values.

43. The system of claim 42, wherein the defined order is alphabetical.

44. The system of claim 42, wherein the defined order is numerical.

45. The system of claim 42, wherein respective blocks are generated from respective sets of data units, and the sets correspond to non-overlapping ranges of key values according to the defined order.

46. The system of claim 30, wherein decompressing a block generated by compressing a set of data units data units includes processing the entire block.

47. The system of claim 30, wherein the data units are records that each has one or more values associated with corresponding fields.

48. The system of claim 47, wherein a key value that identifies a received data unit corresponds to one or more fields associated with the given data unit before being received.

49. The system of claim 47, wherein a key value that identifies a received data unit is assigned to the data unit after being received.

50. The system of claim 49, wherein key values are assigned monotonically.

51. The system of claim 50, wherein key values are assigned sequentially.

52. The system of claim 30, wherein the first set of blocks are stored in a file.

53. The system of claim 52, wherein the processing further includes providing a secondary index associated with the stored blocks in the first set of blocks for determining one or more key values of data units that include a given attribute value.

54. The system of claim 53, wherein the data units are records that each has one or more values associated with corresponding fields, the key value identifying a record corresponds to a primary key value, and the attribute value associated with the secondary index corresponds to a secondary key value.

55. The system of claim 53, wherein the secondary index includes a table having rows sorted by attribute values in the data units other than the key values.

56. The system of claim 52, wherein sorting the data units recovered from the first set and the data units recovered from the second set includes merging the data units recovered from the first set with the data units recovered from the second set according to an order for key values corresponding to the data units to generate the set of sorted data units.

57. The system of claim 30, wherein the probability that the screening data structure determines that a data unit including the given attribute value was possibly included when the data unit was not included depends on the size of the data structure.

58. The system of claim 57, wherein the processing further includes selecting the size of the screening data structure based on the number of data units from which the blocks were generated.

59. A non-transitory computer-readable medium on which is encoded a computer program for managing data, the computer program including instructions for causing a computer to:

receive individually accessible data units, each data unit identified by a respective key value;

store a plurality of sets of blocks of data that comprise a first set of the blocks and a second set of the blocks, the first set of the blocks having a plurality of blocks of data and being generated by compressing a plurality of the data units, the second set of the blocks having one or more blocks of data and being generated by compressing a plurality of data units received after storing the first set of blocks;

decompress the first and second sets of blocks to recover the data units from which the blocks were generated;

sort the data units recovered from the first set and the data units recovered from the second set according to an order for key values corresponding to the data units to generate a set of sorted data units;

generate a third set of blocks, each of at least some of the blocks in the third set being generated by compressing a plurality of the sorted data units; and provide a screening data structure associated with the stored blocks for determining a possibility that a data unit that includes a given attribute value was included in the data units from which the blocks were generated, wherein the screening data structure determines, for a given attribute value, either that a data unit including the given attribute value was definitely not included, or that a data unit including the given attribute value was possibly included.

60. The computer-readable medium of claim 59, wherein the computer program further includes instructions for causing the computer to provide a first index that includes an entry for each of the blocks of the first set of blocks; provide a second index that includes an entry for each of the blocks of the second set of blocks; and after the third set of blocks is generated, generate a third index to replace the first and second indices for searching within the third set of blocks.

61. The computer-readable medium of claim 60, wherein one or more of the entries of the first index enable location, based on a provided key value, of a block that includes data units corresponding to a range of key values that includes the provided key value.

62. The computer-readable medium of claim 60, wherein one or more of the entries of the second index enable location, based on a provided key value, of a block that includes data units corresponding to a range of key values that includes the provided key value.

63. The computer-readable medium of claim 62, wherein one or more of the entries in the index identify a range of key values corresponding to data units from which a corresponding block was generated.

64. The computer-readable medium of claim 63, wherein the range of key values is identified by information including at least one extremum of the range of key values.

65. The computer-readable medium of claim 64, wherein the range of key values is identified by a first extremum from a first entry in the index and a second extremum from a second entry in the index.

66. The computer-readable medium of claim 63, wherein the range of key values is identified by information including at least one extremum of the key values associated with the data units from which the corresponding block was generated.

67. The computer-readable medium of claim 66, wherein the range of key values is identified by a first extremum from a first entry in the index and a second extremum from a second entry in the index.

68. The computer-readable medium of claim 63, wherein each of at least some of the entries in the index identifies a storage location of the corresponding block.

69. The computer-readable medium of claim 60, wherein the third index includes an entry for each of the blocks in the third set, wherein one or more of the entries enable location, based on a provided key value, of a block that includes data units corresponding to a range of key values that includes the provided key value.

70. The computer-readable medium of claim 60, wherein the computer program further includes instructions for causing the computer to provide a screening data structure associated with the stored blocks for determining a possibility that a data unit that includes a given attribute value was included in the data units from which the blocks were generated, wherein the attribute value includes a key value that identifies a data unit.

71. The computer-readable medium of claim 59, wherein at least some of the blocks are generated by compressing the data units based on a defined order for the key values.

72. The computer-readable medium of claim 71, wherein the defined order is alphabetical.

73. The computer-readable medium of claim 71, wherein the defined order is numerical.

74. The computer-readable medium of claim 71, wherein respective blocks are generated from respective sets of data units, and the sets correspond to non-overlapping ranges of key values according to the defined order.

75. The computer-readable medium of claim 59, wherein decompressing a block generated by compressing a set of data units data units includes processing the entire block.

76. The computer-readable medium of claim 59, wherein the data units are records that each has one or more values associated with corresponding fields.

77. The computer-readable medium of claim 76, wherein a key value that identifies a received data unit corresponds to one or more fields associated with the given data unit before being received.

78. The computer-readable medium of claim 76, wherein a key value that identifies a received data unit is assigned to the data unit after being received.

79. The computer-readable medium of claim 78, wherein key values are assigned monotonically.

80. The computer-readable medium of claim 79, wherein key values are assigned sequentially.

81. The computer-readable medium of claim 80, wherein the computer program further includes instructions for causing the computer to provide a secondary index associated with the stored blocks in the first set of blocks for determining one or more key values of data units that include a given attribute value.

82. The computer-readable medium of claim 81, wherein the data units are records that each has one or more values associated with corresponding fields, the key value identifying a record corresponds to a primary key value, and the attribute value associated with the secondary index corresponds to a secondary key value.

83. The computer-readable medium of claim 81, wherein the secondary index includes a table having rows sorted by attribute values in the data units other than the key values.

84. The computer-readable medium of claim 80, wherein sorting the data units recovered from the first set and the data units recovered from the second set includes merging the data units recovered from the first set with the data units recovered from the second set according to an order for key values corresponding to the data units to generate the set of sorted data units.

85. The computer-readable medium of claim 59, wherein the first set of blocks are stored in a file.

86. The computer-readable medium of claim 59, wherein the probability that the screening data structure determines that a data unit including the given attribute value was possibly included when the data unit was not included depends on the size of the data structure.

87. The computer-readable medium of claim 86, wherein the computer program further includes instructions for causing the computer to select the size of the screening data structure based on the number of data units from which the blocks were generated.

* * * * *

UNITED STATES PATENT AND TRADEMARK OFFICE
CERTIFICATE OF CORRECTION

PATENT NO. : 8,639,674 B2
APPLICATION NO. : 13/552706
DATED : January 28, 2014
INVENTOR(S) : Ephraim Meriwether Vishniac et al.

Page 1 of 1

It is certified that error appears in the above-identified patent and that said Letters Patent is hereby corrected as shown below:

In the Claims:

Column 13, line 13, in claim 6, delete "data units data units" and insert -- data units --

Column 13, line 27, in claim 11, delete "Sequentially." and insert -- sequentially. --

Column 15, line 66, in claim 46, delete "data units data units" and insert -- data units --

Column 18, line 15 (approx.), in claim 75, delete "data units data units" and insert -- data units --

Signed and Sealed this
Sixth Day of May, 2014

Michelle K. Lee
*Deputy Director of the United States Patent and Trademark Office*